UNITED STATES PATENT OFFICE.

WALTER S. LANDIS, OF NEW YORK, N. Y., ASSIGNOR TO AMERICAN CYANAMID COMPANY, OF NEW YORK, N. Y., A CORPORATION OF MAINE.

PROCESS FOR THE PRODUCTION AND PURIFICATION OF AMMONIA.

1,296,820.  Specification of Letters Patent.  Patented Mar. 11, 1919.

No Drawing.   Application filed November 5, 1918.   Serial No. 261,198.

*To all whom it may concern:*

Be it known that I, WALTER S. LANDIS, a citizen of the United States, residing at New York city, in the county of New York and State of New York, have invented certain new and useful Improvements in Processes for the Production and Purification of Ammonia; and I do hereby declare the following to be a full, clear, and exact description of the invention, such as will enable others skilled in the art to which it appertains to make and use the same.

This invention relates to a process for making ammonia from crude calcium cyanamid, or lime nitrogen, and has for its object to produce a purer ammonia, and in a manner more expeditious and less costly than has heretofore been proposed.

With these and other objects in view the invention consists in the novel steps and combinations of steps constituting the process, all as will be more fully hereinafter disclosed and particularly pointed out in the claims.

In order that my invention may be clearly understood, it is said:—In U. S. Patent #776314, process of making ammonia, Nov. 29, 1904, to Frank; and in particular #1149653, process of making ammonia from calcium cyanamid, dated Aug. 10, 1915, to W. S. Landis; in #1154640, process of producing ammonia, dated Sept. 28, 1915, to W. S. Landis; and in #1163095, process of making ammonia from calcium cyanamid, dated Dec. 7, 1915, to W. S. Landis, there are described processes for the production of ammonia from calcium cyanamid, commonly found in the market in a crude form known as lime nitrogen. But the ammonia produced by these said processes varies from a very pure gas to one containing greater or less quantities of impurities. These said impurities in turn are derived from the original lime nitrogen, to which they were imparted during the process of manufacture.

The principal impurity found in the lime nitrogen is undecomposed carbid, due to an incomplete nitrification of the large masses of carbid charged into the nitrifying ovens. Under normal operating conditions the quantity of this residual carbid is usually very small, but under emergency conditions, incident to irregularities of plant operation, of raw material supply, and more particularly to an overload capacity on the plant, said impurity may become quite appreciable and run up to several per cent. of the weight of the lime nitrogen produced.

Further, the raw materials, coke and lime, used in the manufacture of calcium carbid are never pure forms of either carbon or of calcium oxid. Various impurities such as sulfur and phosphorus, magnesia, silica, alumina, etc., are found in both of said raw materials, and on passing them through an electric furnace, they undergo various transformations and appear in the lime nitrogen in various forms. Lime nitrogen containing such impurities, when treated for the production of ammonia undergoes a decomposition, and certain of these said impurities produce volatile compounds which appear in the resulting ammonia gas.

The usual method of producing ammonia from lime nitrogen involves the charging of the recovered liquor from a previous operation into an autoclave, and this is followed by a slow feeding of lime nitrogen into said autoclave, accompanied by a constant agitation with, or without the addition of an alkali metal compound. An evolution of impurities such as acetylene, phosphin, silicon hydrid, and other similar volatile compounds immediately occurs, which are largely removed before actually closing up the ammonia autoclave. But at least a portion of said volatile impurities dissolves in the large volume of liquor in the autoclave, and remains in solution until after the pressure vessel is closed. A further portion of these said volatile impurities may even remain undecomposed for some little time even though they are in the presence of the solutions in the autoclave.

When the autoclave is closed, the steam turned on, and the contents heated, the gases in solution are liberated together with final compounds, or residual products formed from these said impurities. These impurities, therefore, in one form or another pass off with the ammonia, contaminating the same, and damaging its use for certain purposes.

It is true the quantity of such impurities is sometimes extremely small, being usually measured not ordinarily in terms of a percentage, but rather in terms of parts per million of ammonia gas, but nevertheless in certain cases it is often of marked advantage to remove them before using the ammonia.

Under extremely rapid working, such as most ammonia plants are forced to adopt under present conditions, in making ammonia from lime nitrogen, the proper time for the charging of the lime nitrogen and the liberation of these gases cannot be taken, and therefore, in such cases it is not infrequent to find several times the quantity of these impurities present in the ammonia as would be found under normal working conditions.

This invention provides a process of removing these impurities in a comparatively simple manner, and to a comparatively high degree. It involves the following manipulation or procedure:—Commercial lime nitrogen, or other cyanamid compound is formed into a slurry with water or recovered liquor from a previous operation. The usual additions of alkali are made to the slurry if found advisable, and after the whole mass is in suspension through mechanical agitation, I blow a current of air through the mixture. This air removes any acetylene present in a comparatively short time down to a few parts per million of ammonia gas, and if continued for a longer time, completely eliminates acetylene down below the point at which it can be chemically determined.

The blowing of the air through the slurry also reduces the content of phosphin. In fact, said air readily takes out 95% of the phosphin ordinarily found in such a slurry before treatment, and reduces its residual content of phosphin to less than one part per million of ammonia. Sulfur is eliminated by said air to the extent of about 75% of the usual quantity present, the remainder apparently being in some undecomposable form to the extent of a few parts per million of ammonia gas.

Other gaseous impurities are apparently removed at the same time by the air current treatment, but as they are present initially in such extremely small quantities, chemical methods for their determination after treatment fail at this great dilution, and therefore, I am not prepared to give quantitative figures as to the efficiency of their removal by this method.

Temperature plays an important part in this method of removal of the impurities, and the process is aided by the fact that the residual solutions used are hot from a preceding operation and from the heat evolved from the lime nitrogen stirred into them. It is therefore possible to so operate that aeration can be readily carried on at a comparatively high temperature, or just below the boiling point, so that the elimination of the impurities is very greatly assisted and accelerated while at the same time the ammonia evolution is not started.

It is self-evident that the slurry may be produced directly in the autoclave, as in the usual procedure of producing ammonia from lime nitrogen, and that the air used for aeration may be introduced at the bottom of the vessel and preferably through the same nozzles through which steam is subsequently introduced, without changing the essential character of the equipment at present employed, otherwise than to connect in a suitable manner, the steam lines with a source of compressed air of comparatively low pressure. In other words, the present operating equipment can be readily adapted to my process.

It is self evident also that the production of the slurry may take place in a vessel outside of the autoclave and aeration be carried on in this extraneous vessel. When aeration is complete in this latter case, the contents may be discharged into the autoclave in any suitable manner.

Since nitrogenous compounds having a cyanogen radical, produce ammonia by steam treatment in much the same manner as calcium cyanamid or lime nitrogen, and since in some of the newer methods of fixing atmospheric nitrogen, impure cyanid compounds are obtained, it is evident that my improved process is adapted to the production of pure ammonia from cyanids, as well as from other nitrogenous compounds containing a cyanogen radical, CN.

It is, of course, obvious that those skilled in the art may vary the details of my process without departing from the spirit of the invention, and therefore, I do not wish to be limited to the above disclosure except as may be required by the claims.

What I claim is:—

1. The process of making ammonia from an impure compound of the nature of a cyanamid or a cyanid, which consists in mixing said compound with water to form a slurry; blowing an inert gas through said slurry to remove some of the impurities present; and subjecting the slurry to the action of heat and pressure to produce the desired ammonia, substantially as described.

2. The process of making ammonia from a cyanamid or cyanid compound which consists in making a slurry of said compound; blowing air through said slurry while in a heated condition; and subjecting the treated slurry to heat and pressure to form the desired ammonia, substantially as described.

3. The process of producing ammonia from a nitrogenous compound containing a cyanogen radical consisting in forming a slurry of said compound at a temperature below that at which the ammonia reaction takes place; blowing an inert gas through the said slurry and subsequently increasing the temperature of the slurry above the point at which the production of ammonia begins to take place; and continuing the heating of said slurry until the reaction is complete, substantially as described.

4. The process of producing ammonia from a nitrogenous compound capable of evolving ammonia when heated with water under pressure, consisting in forming a slurry of said compound at a temperature below that at which the production of ammonia begins; blowing air through said slurry; then raising the temperature of said slurry to start the ammonia reaction; and continuing said ammonia reaction until it is completed, substantially as described.

5. The process of producing ammonia from a cyanamid compound, consisting in forming a slurry of said cyanamid compound; blowing air through said slurry; then raising the temperature of said slurry to a point to which an ammonia production begins; and carrying said ammonia production to completion, substantially as described.

6. The process of producing ammonia from an impure cyanamid compound consisting in forming a slurry of said cyanamid compound at a temperature above that of the atmosphere, but below that at which an ammonia production begins, to permit certain gaseous impurities present to escape; then heating said slurry under pressure to a temperature above that at which ammonia production begins; and continuing the reaction until the ammonia production is completed, substantially as described.

7. The process of producing ammonia from an impure calcium cyanamid consisting in making a slurry of said cyanamid at a temperature below that at which an ammonia production takes place; blowing air through said slurry; and then treating said slurry in the usual manner for the production of ammonia, substantially as described.

8. The process of producing ammonia from lime nitrogen consisting of making a slurry of lime nitrogen with the addition of an alkali and at a temperature below that at which an ammonia production takes place; blowing air through said slurry and then treating said slurry in the usual manner for the production of ammonia, substantially as described.

9. The process of producing ammonia from lime nitrogen consisting in making a slurry of lime nitrogen with recovered liquor from a previous operation; adding alkali to said slurry; maintaining the temperature of said slurry below the critical temperature at which an ammonia evolution starts; blowing an inert gas through said slurry; then reacting with steam on said slurry for the production of ammonia, discharging the ammonia produced; and repeating the steaming operation until substantially all the ammonia is evolved, substantially as described.

In testimony whereof I affix my signature in presence of two witnesses.

WALTER S. LANDIS.

Witnesses:
  O. O. RIESER,
  C. F. CARRIER, Jr.